United States Patent [19]

Shrader et al.

[11] 4,117,538
[45] Sep. 26, 1978

[54] RADAR SYSTEM WITH SPECIALIZED WEIGHTING

[75] Inventors: William W. Shrader, Stow; Ronald B. Campbell, Jr., Sudbury, both of Mass.

[73] Assignee: Raytheon Company, Lexington, Mass.

[21] Appl. No.: 793,578

[22] Filed: May 4, 1977

[51] Int. Cl.² ................... G01S 9/42; G06F 15/20
[52] U.S. Cl. ..................... 364/517; 343/5 VQ; 343/7.7; 364/581; 364/724
[58] Field of Search ............ 364/517, 516, 574, 581, 364/724; 343/7 A, 7 HG, 7.7, 17.2, 5 DP, 5 VQ

[56] References Cited

U.S. PATENT DOCUMENTS

| | | | |
|---|---|---|---|
| 3,359,556 | 12/1967 | Bosc et al. | 343/17.2 |
| 3,404,399 | 10/1968 | Eschner | 343/7.7 |
| 3,441,930 | 4/1969 | D'Obrenan et al. | 343/7.7 |
| 3,680,096 | 7/1972 | Bosc | 343/7.7 |
| 3,696,235 | 10/1972 | Tufts et al. | 364/724 |
| 3,699,321 | 10/1972 | Gibson | 364/724 |
| 3,721,978 | 3/1973 | Doggett | 343/7 A |
| 3,781,883 | 12/1973 | Effinger et al. | 343/7 A |
| 3,987,442 | 10/1976 | McLeod, Jr. | 343/7.7 |
| 4,044,352 | 8/1977 | Wilmot | 343/5 VQ |

Primary Examiner—Felix D. Gruber
Attorney, Agent, or Firm—David M. Warren; Milton D. Bartlett; Joseph D. Pannone

[57] ABSTRACT

A radar system including an azimuthally scanned radar wherein the radar receives echo signals during each of a succession of azimuthally scanned directions of the radar receiving beam. Sequences of samples of data of received echo signals are stored with sets of samples relating to a common range being utilized for developing weighting factors for weighting received echo signals as a function of range. Thereby, dynamic fluctuations in signals strength because of clutter are reduced.

12 Claims, 4 Drawing Figures

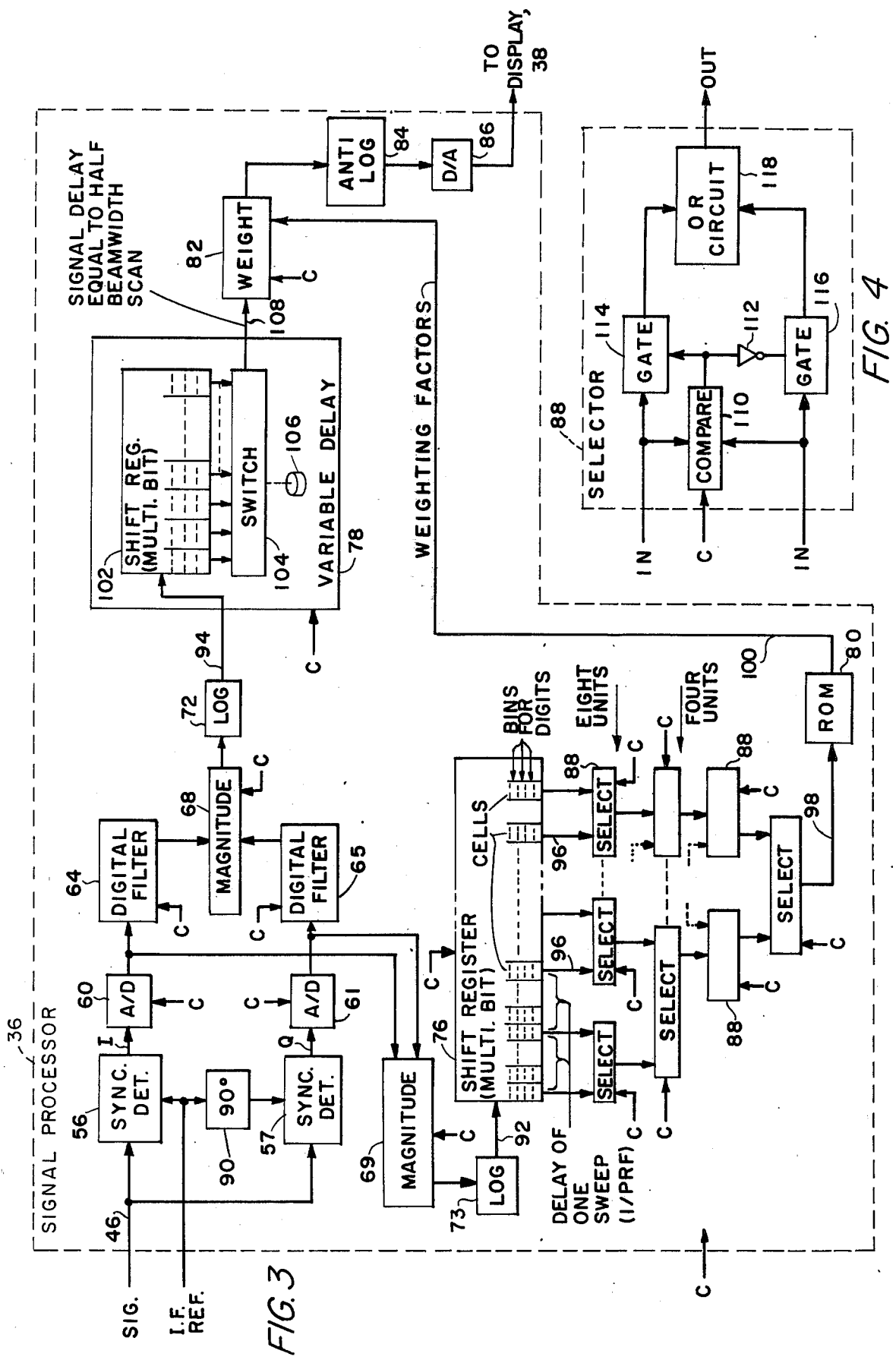

RADAR SYSTEM WITH SPECIALIZED WEIGHTING

BACKGROUND OF THE INVENTION

In the processing of radar video signals by filtering, a residue of the filtering operation may sometimes be sufficiently large so as to falsely indicate the presence of a target when, in fact, the residue resulted from a strong clutter signal. For example, in an MTI (moving target indication) radar, the filter or canceller typically comprises delay lines having delays in integral multiples of the transmission period (the reciprocal of the pulse repetition frequency). The subtraction of a strong echo such as that produced by a water tower from the previously occurring echo of the same water tower produces a cancellation of the water tower echo signal except for the residue of the filtering operation. A target such as a moving aircraft moving toward or away from the radar results in an echo signal which is not canceled, the moving target echo signal being passed without attenuation by the filter due to the changing range and echo propagation time as is known from the theory of MTI radars. The theory of MTI radars is explained in the book "Radar handbook" by M. I. Skolnik, published by McGraw-Hill Book Company in 1970.

A problem arises in that previous attempts of the prior art to reduce the overloading effect of large amplitude residue signals by decreasing the dynamic range of the IF (intermediate frequency) amplifier stages of the radar has produced MTI radars which do not achieve their maximum potential capability. An IF amplifier without the gain restriction produces, subsequent to the filtering or canceling operation, the aforementioned large residues from strong clutter with the attendant difficulties in obtaining data of the true target versus the clutter returns.

SUMMARY OF THE INVENTION

The aforementioned problem is overcome and other advantages are provided by a radar system including a filtering operation such as that of an MTI canceller wherein the radar includes in accordance with the invention, a selective gain control or weighting circuit wherein output signals of the filter or canceller are selectively weighted in accordance with the clutter measured at various ranges from the radar. More particularly, the clutter measurements are obtained for increments in range corresponding to a range cell wherein the length of a range cell is equal to the range resolution capability of the radar, the range resolution capability, as is well known, being determined by the bandwidth of the transmitted radar pulse.

In the case of a scanning radar, such as a radar which scans in azimuth, clutter measurements are made in each of a sequence of azimuthal directions of the radar beam. The invention provides for a temporal relationship between the measurement and the weighting such that the filtered radar signals received from echoes in a specific azimuthal direction are given a weighting based upon the measurements of clutter in both the proceding and succeeding azimuthal directions of the scanned radar beam.

The teachings of the invention apply equally well to a sonar system wherein the sonar receiving beam is directed toward a source of sound. The signals received from successive sonic echoes are then weighted in accordance with clutter or reverberation measured in each of a succession of range cells with the measurements obtained for each of the range cells being utilized for providing weighting factors for weighting received data in accordance with the range cells wherein the data appears. In the ensuing description, the invention will be described with reference to a radar system for convenience in explaining the invention, it being noted that hereinafter a reference to radar is understood to include a reference to sonar.

As an example, in the implementation of the invention, it will be assumed that the invention is utilized with an azimuthally scanning MTI radar. In a preferred embodiment of the invention, the receiver of the radar provides for inphase and quadrature detection of the received radar echo signal. The inphase and quadrature components are sampled and converted from analog to digital signals representing the real and imaginary parts of a complex number giving the amplitude and phase of the sample of the echo signal. A sample is obtained for each range cell. The magnitudes of the complex numbers of the respective samples are then stored sequentailly in the order of occurrence of the samples, the storing procedure being repeated for successive directions of the azimuthally scanned beam. Thereby, there is stored a past history of received clutter on a range cell basis for each of a succession of scanned beam positions. While the measurement of the clutter for determining the weighting factors may be accomplished over a few azimuthal scan directions on both sides of the target direction, it is preferable to extend the measurements of clutter over a sufficient number of scan directions to provide observation of the clutter of a half-beamwidth sector to each side of the target whereby the weighting of the filtered echo signal is based upon the clutter measured in a beamwidth centered on the target. For example, in the case of a radar having a beamwidth of 3° and transmitting 16 radar pulses during a 3° sector of the scan, the measurement for weighting would involve the storing of the clutter returns of the echo signals from each of the 16 transmitted radar pulses. While the preferred embodiment of the invention utilizes inphase and quadrature channels with digital signal processing, it is to be understood that the invention may be utilized for a single-channel analog-signal receiver with envelope detection employed to provide the signal magnitude.

With reference to the proceding example of the 16 radar transmissions, the filtered signal is delayed by an amount of time equal to eight periods of the radar pulse transmission so that the weighting measurement is centered on the beam. The centering occurs because eight measurements are for eight beam directions which precede the direction of the beam center line while eight measurements are for eight beam directions subsequent to the direction of the beam center line. A memory stores the clutter returns in each range cell of a set of 16 range cells wherein each range cell of the set represents the same range, and wherein each of the 16 range cells of the set corresponds to one of the 16 radar transmissions. A selection circuit is coupled to the memory and selects the signal of a cell based on a particular characteristic of the clutter in the set of 16 range cells, for example, the largest magnitude of clutter found in the set. Alternatively, a mean value of the clutter or a mean squared value of the clutter in the set of the 16 range cells may be selected. In the preferred embodiment of the invention, the maximum value of clutter in the set of 16 range cells is utilized. To obtain the desired weighting factor, a memory such as a read-only-memory is addressed by the selection circuit to provide a desired weighting factor for the specific amplitude of clutter selected in a specific set of range cells. As later and later samples of the echo signal exit from the radar filter, the selection circuit observes sets of later occurring range cells so that the weighting factor applied to any one sample of the filtered echo signal is based upon the range represented by that specific sample of the filtered echo signal.

In order to reduce the number of digits or bits in the digital signals which are stored in the memory of the clutter signals and in the memory for the weighting factors, and as are utilized in the multiplication by the weighting factors, it has been found convenient to utilize a logarithmic circuit for converting the magnitude of the complex numbers to the logarithm of the magnitude whereupon the logarithmic representations are stored in the memories and are utilized in the weighting, a multiplication being obtained by a summation of the logarithms of the clutter signal and of the weighting factor. Thereafter, the output of a multiplier utilized for the weighting multiplication is applied to an antilogarithmic circuit to regenerate the filtered signal magnitude as weighted by the weighting factors.

The use of weighting factors based upon the magnitude of the largest clutter return in a set of range cells provides for a reduction in the amplitude of echo signals and in the residue of a canceling operation of the echo signals returned from a strong reflector such as a water tower. For an MTI radar, the return from a water tower situated on top of a hill in the direction of a moving aircraft is regarded as a strong clutter return since it is the moving aircraft which is regarded as a target to be observed. The strength of an echo from the aircraft is substantially less than that from the water tower. While the echoes of a succession echoes from the water tower are subtracted from each other by an MTI canceller, the residue of such cancellation is more readily distinguished from the uncanceled aircraft signals by the aforementioned weighting. It is noted that since the weighting is accomplished as a function of range from the radar, a relatively large amount of weighting is applied to echoes of the water tower while relatively little or no weighting is applied to the echoes of the aircraft which is typically at a different range than the water tower. Thus, the aircraft is readily distinguished from the residue of the cancellation of strong clutter.

BRIEF DESCRIPTION OF THE DRAWINGS

The aforementioned aspects and other features of the invention are explained in the following description taken in connection with the accompanying drawings wherein:

FIG. 3 is a block diagram of a signal processor of FIG. 1 showing, in accordance with the invention, the storing and selection of clutter samples and the weighting of a filtered echo signal in accordance with the clutter magnitude; and FIG. 4 is a diagram of a selector utilized in FIG. 3.

DESCRIPTION OF THE PREFERRED EMBODIMENT

Figure 1:
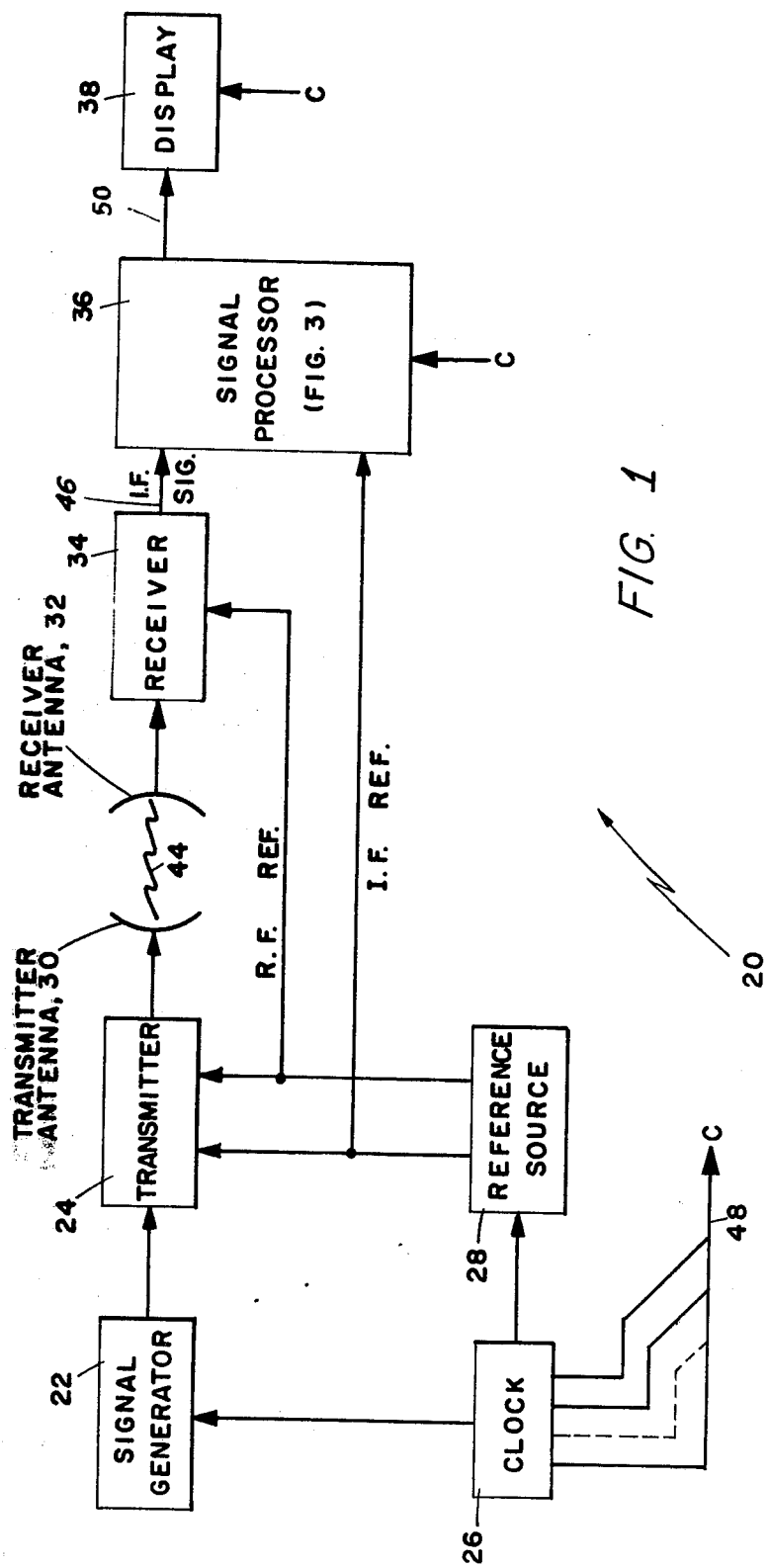
FIG. 1 is a block diagram of a radar system incorporating the invention.

Referring now to FIG. 1, there is seen a block diagram of a radar system 20 comprising a signal generator 22, a transmitter 24, a clock 26, a reference source 28, a transmitting antenna 30, a receiving antenna 32, a receiver 34, a signal processor 36 and a display 38. The invention is incorporated within the signal processor 36 which will be described in further detail in FIG. 3. The embodiment of FIG. 1 shows a bistatic radar having spaced apart antennas 30 and 32 for use with the invention. Alternatively, a single antenna 40 as seen in FIG. 2 may be utilized, the transmitter 24 and the receiver 34 being coupled to the antenna 40 of FIG. 2 by a duplexer 42.

The clock 26 provides timing signals which drive the signal generator 22 and the reference source 28 in synchronism therewith. The source 28 produces a radio frequency (RF) reference signal and an intermediate frequency (IF) reference signal for the transmitter 24, the RF reference signal being applied also to the receiver 34 while the IF reference signal is applied also to the signal processor 36. The transmitter 24 includes mixers for translating a signal produced by the generator 22 onto an IF carrier and thence onto an RF carrier for transmission via the antenna 30. The transmission path 44 for which radiant energy propagates from the antenna 30 to the antenna 32 is understood to include a source of reflection such as a target aircraft. Echo signals from the aircraft incident upon the receiving antenna 32 are amplified by the receiver 34, the receiver 34 including a mixer which mixes the echo signal with the RF reference signal to translate the echo signal down to an IF carrier, the translated signal appearing on line 46. The signal on line 46 is then processed by the processor 36 and is then utilized as by being displayed on the display 38, or utilized, for example, by a computer (not shown) for target identification and automatic tracking. The clock 26 provides timing signals, seen fanning into line 48 and coupled via terminal C to the processor 36 and the display 38 for operating digital circuitry therein and synchronizing their operation with the operation of the generator 22 and the transmitter 24.

In accordance with the invention, the signal processor 36 incorporates the circuitry for storing the magnitudes of clutter echo signals propagating along the path 44 and resulting from a sequence of radar pulse transmissions by the transmitter 24. Signals on line 46 are filtered by the processor 36 and then weighted by factors selected in accordance with a characteristic of the magnitudes of the stored clutter returns thereby providing on line 50 a signal which is free of excessively large residues of filtered clutter.

Figure 2:
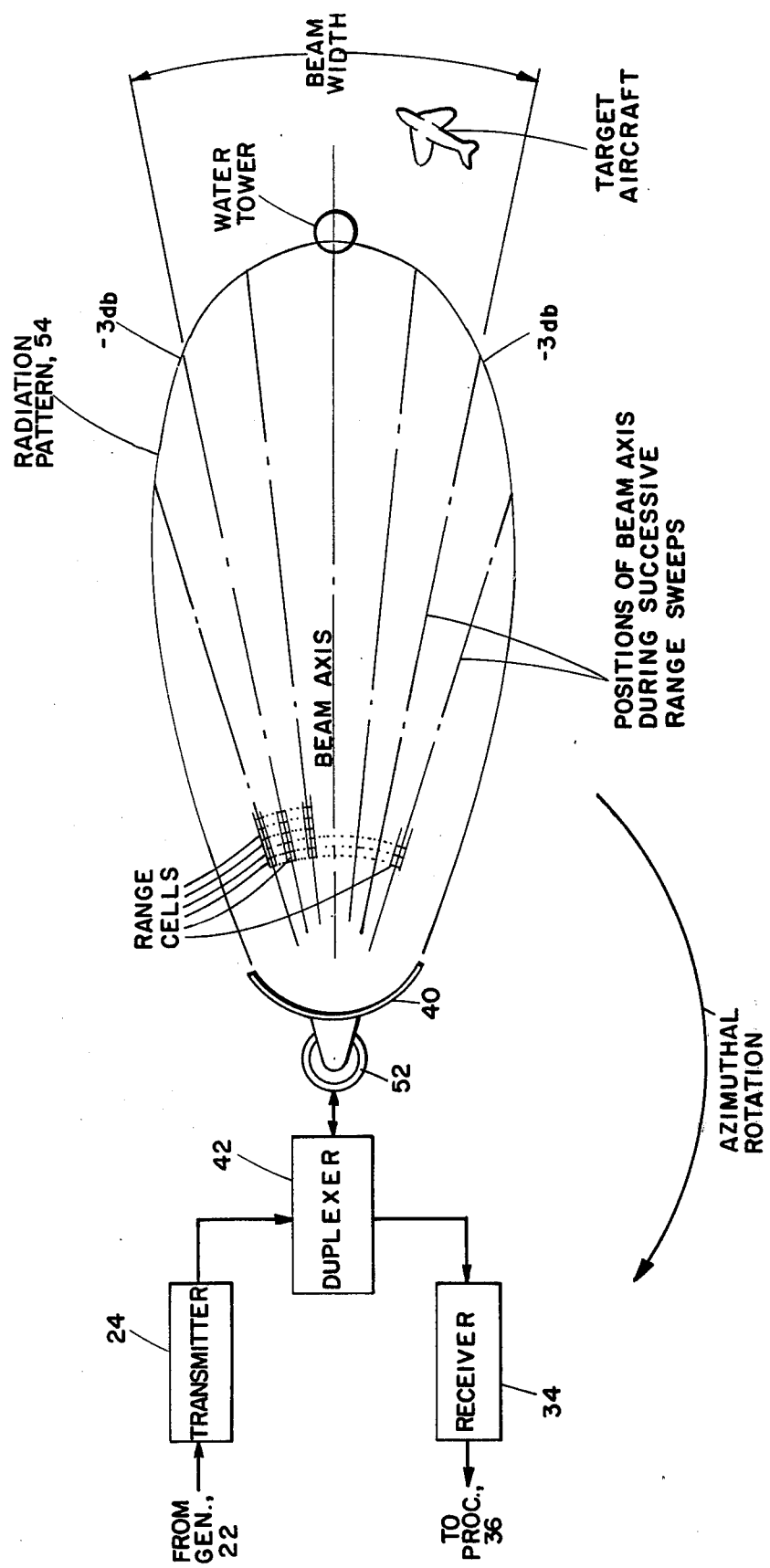
FIG. 2 is a stylized plan view of an azimuthally scanning radar antenna for the radar system of FIG. 1, the figure showing successive transmissions of the radar pulse during the scanning of a sector equal to the width of the radar beam.

Referring now to FIG. 2, there is seen an alternative embodiment of the system 20 wherein the transmitter 24 and the receiver 34 are coupled to the common antenna 40 by the duplexer 42. The duplexer 42 provides for the coupling of signals from the transmitter 24 directly to the antenna 40 while received signals are coupled from the antenna 40 by the duplexer 42 to the receiver 34. The antenna 40 is seen to rotate clockwise about the antenna base 52. The radiation or directivity pattern 54 shown in FIG. 2 is understood to be the same for both the transmission and the reception of signals by the antenna 40. If desired, a phased array antenna, wherein the radar beam is scanned stepwise, may be utilized for the antenna 40.

The figure shows successive positions of the beam axis during successive transmissions, or range sweeps, by the transmitter 24 as the antenna 40 rotates in azimuth. A water tower is shown near the present beam axis while a target aircraft is shown off to the side of the water tower and at a greater range from the antenna 40. The beamwidth between the points at which the intensity of radiation in the radiation pattern is reduced by 3dB (decibels) is shown in the figure. The range sweeps in a sector equal to approximately one beamwidth provide clutter data which is stored in a memory of the processor 36 of FIG. 1. If desired, a larger sector such as two beamwidths may be utilized for more clutter data. Also, shown in the figure are exemplary range cells representing the range resolution capability of the radar system 20, a set of cells being seen on individual ones of the range sweeps and being symmetrically positioned radially about the antenna 40.

Referring now to FIG. 3, the signal processor 36 is seen to comprise two synchronous detectors 56 and 57, two analog-to-digital converters 60 and 61, two digital filters 64 and 65, two magnitude units 68 and 69, two logarithmic units 72 and 73, storage units 76 and 78, a memory 80, a weighting unit 82, an antilogarithmic unit 84, a digital-to-analog converter 86 and selection circuitry comprising a set of selectors 88. The signal on line 46 is applied to an input terminal of each of the detectors 56 and 57. The IF reference signal is applied to a reference input terminal of the detector 56 and is coupled via a 90° phase shifter 90 to the reference input terminal of the detector 57. The inphase component of the amplitude of the echo signal on line 46, represented by the letter I, is produced by the detector 56 and applied to the converter 60 to be converted from an analog signal to a digital signal. The quadrature component of the echo signal, represented by the letter Q, is produced by the detector 57 and applied to the converter 61 to be converted from an analog signal to a digital signal. The converters 60 and 61 are operated by clock pulses provided at terminal C, the clock pulses being produced by the clock 26 of FIG. 1. The signals from the converters 60 and 61 are coupled to the magnitude unit 69 which combines the inphase and quadrature components of the digital complex number of the converters 60 and 61 to form the magnitude of the complex digital number, the magnitude being also the magnitude of the echo signal on line 46. The digital number representing the magnitude is coupled from the magnitude unit to the logarithmic unit 73 which provides a digital number on line 92 which represents the logarithm of the magnitude of the echo signal.

Each of the digital filters 64 and 65 comprises digital delay lines, such as shift registers, summation points and multipliers for filter gain factors such as are present in an MTI canceller disclosed in chapters 17 and 35 of the aforementioned Skolnik. In particular, it is noted that the delays produced by the delay lines of the filter 64 are, in the case of an MTI canceller, integral multiples of the period of transmission of radar pulses by the transmitter 24 of FIG. 1, this being equal to integral multiples of the reciprocal of the pulse repetition frequency. Other filter configurations such as transversal filters, also disclosed in Skolnik, may be utilized. The filter 64 filters the inphase component while the filter 65 filters the quadrature component of the echo signal, the output signals of the filter 64 and 65 presenting the inphase and quadrature components of a complex number representation of the echo signal. The complex number is then applied to the magnitude unit 68 which produces the magnitude of the complex number. The digital output of the magnitude unit 68 is coupled to the logarithmic unit 72 which provides a logarithmic representation of the filtered echo signal on line 94. In particular, it is noted that the logarithmic representations on the lines 92 and 94 comprises digital numbers having significantly less digits than the number of digits in the digital signal produced by the magnitude units 69 and 68.

The storage units 76 and 78 may each comprise a random access memory (not shown) or a shift register as is shown in the figure. The shift register of the storage unit 76 is seen to comprise a series of cells which correspond to the range cells of FIG. 2. The shift register is sufficiently long to provide sufficient capacity to store clutter data of the range cells in each of the beam directions falling within the antenna beamwidth of FIG. 2. Referring to the previously mentioned example in which there are 16 transmissions for range sweeps within a sector equal to the antenna beamwidth, the shift register has a number of cells equal to 16 times the number of range cells in any one of the range sweeps of FIG. 2. As a practical matter in the implementation of the processor 36, it is noted that clutter returns are most significant only during the relatively short ranges of an air surveillance radar and, accordingly, the clock 26 of FIG. 1 need provide clock pulses for strobing the shift register only during the short range portion of the range sweeps of FIG. 2 in which case the storage unit 76 can have substantially fewer cells. Large clutter returns or echoes from stationary objects such as water towers are significant only during the short range portion of a range sweep, while echoes from aircraft at long range, particularly where range gating of the receiver is implemented, are not significantly effected by ground clutter. Also, it is noted that clutter returns from successive sweeps tend to be highly correlated, so that, if desired, data need not be stored from all sweeps within storage unit 76. For example, data my be stored on every fourth sweep within the sector of FIG. 2 in which case, the timing signals at terminal C of the storage unit 76 admit signal samples during every fourth sweep.

Each cell of the shift register of the storage unit 76 comprises a plurality of bins for storing the plurality of digits or bits in the logarithimic digital representation of a sample of the echo signal. The shift register is clocked by clock pulses at terminal C at a rate equal to the sampling rate of the converters 60 and 61, the rate being equal to the reciprocal of the time delay between successive range cells of FIG. 2, so that successive samples of clutter data pass serially down the shift register, the shift register containing a past history of the clutter in 16 range sweeps.

The shift register of the storage unit 76 is seen to have 16 output lines which are coupled in pairs to eight to the selectors 88. As the data in the cells of the shift register is clocked through the shift register, it experiences a delay as it progresses from cell to cell. The delay between each output line 96 of the shift register is equal to the period between transmissions of the transmitter 24 of FIG. 1 such that data incident upon the second of the output lines 96 is delayed by one transmission period from the data incident upon the first of the output lines 96. Similar comments apply to the delays of propagation of data through the shift register to the successive ones of the lines 96.

The selector 88, which will be described in further detail in FIG. 4, compares the amplitude of the digital numbers on a pair of output lines 96. The selection circuitry comprises a set of eight units or selectors 88 which are coupled directly to the shift register of the storage unit 76. The next line of selectors 88 comprises four units each of which has a pair of input terminals coupled to the output terminals of a pair of selectors 88 of the previous line of eight units. This scheme of interconnection, frequently referred to as a tree, continues with two selectors 88 in the third line and one selector 88 in the fourth line of the selection circuitry. Each selector 88 in the first line couples the larger of the two signals incident thereupon to the selector in the second line. Thereby, the 16 signals incident upon the first line of selectors 88 are reduced in number to eight signals which are incident upon the second line of selectors 88, the signals being again reduced in number to four signals incident upon the third line and two signals incident upon the final selector 88. Thereby, a selector 88 couples the largest digital number stored in a set of cells of the shift register of the storage unit 76 along line 98 to address the memory 80. Because of the delays between each of the output terminals of the shift register, the signals on each of the lines 96 represent clutter data in range cells located equal distant from the antenna 40 in each of the range sweeps of FIG. 2. In the bistatic case of FIG. 1, the data refers to cells of the loop range from the antenna 30 to the target to the antenna 32. Accordingly, with reference to FIGS. 2 and 3, the digital number on line 98 is the logarithm of the magnitude of the largest clutter return at a given range from the antenna 40, the specific range varying in time and the number on line 98 also varying in time correspondingly, as the data is shifted down the shift register of the storage unit 76.

The memory 80 which may be a read-only-memory contains a set of weighting factors, each factor corresponding to a magnitude of digital number appearing on line 98. Thereby, each number on line 98 addresses a particular weighting factor in the memory 80 to provide a weighting factor on line 100 for the weighting unit 82 corresponding to the magnitude of the clutter return of a specific range within the beamwidth of the antenna 40 of FIG. 2.

The storage unit 78 comprises a shift register 102 which is similar to the shift register of the storage unit 76, and a switch 104 with a knob 106 thereon for selectively coupling one of a plurality of output ports of the shift register 102 to line 108. The signals on line 94 are sequentially clocked through the shift register 102 in response to clock pulses at terminal C, the digital signals appearing sequentially at each of the output ports of the respective cells of the shift register 102. A delay equal to the period of the clock pulse signal is provided between the output ports of the shift register 102 and, accordingly, the selection of a specific one of the output ports of the shift register 102 by the switch 104 provides a predetermined delay to a signal propagating from line 94 to line 108. The delay is adjusted by the knob 106 so that the total delay of the response time of the digital filter 64, or of the filter 65 which has a response time equal to that of the filter 64, plus the delay of the storage unit 78 is equal to one half the total delay provided by the storage unit 76. Recalling that the total delay of the storage unit 76 is equal to the time required for the beam axis of FIG. 2 to scan through a sector equal to the beamwidth, the appearance of a signal on line 108 at the same time as required for the corresponding signal to pass half way through the storage unit 76 results in the weighting factor of the memory 80 being selected in accordance with data of clutter in the half beamwidth ahead of the beam axis and in the half beamwidth lagging the beam axis during the azimuthal scanning of the beam. In this way, the weighting is based on a symmetry of the clutter data about the target.

The clock pulse signals at terminal C provide that the weighting factor on line 100 and the signal to be weighted on line 108 appear simultaneously at the weighting unit 82 whereupon the signal on line 108 is combined with the signal on line 100. The weighted signal appearing at the output of the multiplier 82 is then applied to the antilogarithmic unit 84 which provides an inverse logarithmic operation to regenerate the original form of the filtered signal. Thereupon the filtered signal at the output of the antilogarithmic unit 84 is converted to an analog signal by the converter 86, the analog signal being coupled to the display 38 of FIG. 1.

Since the signal on line 108 is in logarithmic form, the weighting factor on line 100 is also in logarithmic form. Accordingly, a weighting or multiplication effect is accomplished in the weighting unit 82 by summing together the logarithmic signals on the lines 100 and 108. The summing is accomplished by an arithmetic unit (not shown) within the weighting unit 82, the arithmetic unit performing addition and subtraction of the logarithmic signals corresponding to a positive or negative sign bit included with the digital number on line 100. By way of alternative embodiments of the invention, it is noted that the logarithmic units 72 and 73 and the antilogarithmic unit 84 may be deleted in which case the signal magnitudes produced by the magnitude units 68 and 69, rather than their logarithms, are utilized. Accordingly, in the absence of the logarithms, the weighting or multiplication effect is accomplished in the weighting unit 82 by a multiplier (not shown) which multiplies the signal on line 108 by the signal on line 100.

Referring now to FIG. 4, the selector 88 comprises a digital comparator 110, a digital inverter 112, two gates 114 and 116 and an OR circuit 118. The comparator 110 compares digital input signals on the two input lines of the selector 88 and applies a high voltage, or a logic state of 1, to the gate 114 when the input to the gate 114 is the larger of the two input signals, the comparator 110 applying a low voltage, or logic state of 0, via the inverter 112 to the gate 116 when the input to the gate 116 is the larger of the two input signals. The gates 114 and 116 are of similar construction and may comprise a set of parallel AND gates for passing each of the digits in the multidigit digital numbers of the respective input signals. In response to the high voltage coupled to the gate 114, the gate 114 couples its input signal via the OR circuit 118 to the output terminal of the selector 88; similarly, when activated by the high voltage applied thereto, the gate 116 couples its input signal via the OR circuit 118 to the output terminal of the selector 88. Thereby, the selector 88 couples the larger of the two input signals to its output terminal.

Returning to FIG. 3, it has been noted above that the storage unit 78 may comprise, in lieu of the shift register 102, a random access memory (not shown). Therein the succession of signals on line 94 would be sequentially addressed into specific locations of the memory, and later, after the predetermined delay and in response to the clock pulse signals at terminal C, the signals would be sequentially addressed for being read out of the memory to line 108. Thus, the storage unit 78 as well as the storage unit 76 may be viewed alternatively as a means for storing a past history of signal samples or as a means for delaying the appearance of the signal samples by a predetermined amount of time.

In the event that it is desired to select the weighting factors from the memory 80 on the basis of the root-mean-square value of the set of signals appearing on the output line 96 of the storage unit 76, the signals on each of the lines 96 would be applied to a squaring unit (not shown) for squaring each of the signals, the output of the squaring unit being applied to a summing unit (not shown) of which the output would be applied to a square root unit (not shown). The output of the square root unit, which would appear on line 98, would then consist of a digital number equal to the root-mean-square value of the signals on line 96. The foregoing root-mean-square circuitry is advantageous in the situation where clutter from sources at a common range randomly fluctuate with fluctuations comparable to the magnitude of the return from the water tower.

It is understood that the above-described embodiment of the invention is illustrative only and that modifications thereof may occur to those skilled in the art. Accordingly, it is desired that this invention is not to be limited to the embodiment disclosed therein but is to be limited only and defined by the appended claims.

What is claimed is:

1. A system for processing signals comprising:
   means for sampling signals at each interval of a first series of predetermined intervals of time to provide a first series of samples;
   means for activating said sampling means to sample signals during a second and a subsequent series of predetermined intervals of time to provide a second and a subsequent series of samples, thereby generating a first set of samples consisting of the first sample in said first, in said second and in said subsequent series, and further generating a second and a subsequent set of samples consisting respectively of the second and a subsequent sample in said first, in said second and in said subsequent sample series;
   means for selecting a specific magnitude of sample of said first, of said second and of said subsequent sets of samples to provide selected samples; and
   means coupled to said selecting means for weighting a first sample, a second sample and a subsequent sample of a series of samples of said sampling means respectively by weighting factors corresponding to said selected samples.

2. A system according to claim 1 further comprising filtering means interconnected between said sampling means and said weighting means for filtering samples of successive series of samples.

3. A system according to claim 2 further comprising means interconnected between said sampling means and said weighting means for delaying samples presented to said weighting means until said selecting means has provided a corresponding sample of said selected samples.

4. A system according to claim 1 wherein said selecting means comprises means for storing a past history of a plurality of said sets of samples.

5. A system according to claim 4 wherein said selecting means is responsive to each of the samples in a set of said samples for selecting a sample of said set of samples having a predetermined characteristic.

6. A system according to claim 5 wherein said selecting means includes means for selecting the largest sample of said set of samples.

7. A system according to claim 5 wherein said weighting means includes a memory for storing a set of weighting factors, said memory being addressed by selected samples of said selecting means.

8. A system according to claim 4 further comprising logarithmic means interconnected between said sampling means and said selecting means for reducing the number of digits in samples presented to said selecting means.

9. In a radar system providing a succession of range sweeps wherein a sequence of echo signals is produced during each of said range sweeps, a system for processing said echo signals comprising:
   means for sampling signals at predetermined intervals of each of said sequences of echo signals to provide a plurality of series of samples with individual ones of said series corresponding to individual ones of said echo signal sequences;
   selecting means responsive to sets of said samples wherein the first set of said sets consists of the first sample in each of said series, the second set of said sets consists of the second sample in each of said series, and subsequent sets consist respectively of subsequent samples in each of said series, said selecting means selecting a magnitude of sample in each of said sets; and
   means coupled to said selecting means and responsive to selections of said selecting means for weighting successive samples in one of said series of samples of said sampling means by weighting factors corresponding to respective ones of said selections.

10. A signal processor responsive to a succession of series of samples comprising:
    means for storing said succession of series of samples, said storing means providing sets of said samples wherein a first set consists of the first sample in each of said series, a second set consists of the second sample in each of said series, and subsequent sets consist respectively of subsequent samples in each of said series;
    means responsive to the samples in respective ones of said sets for generating signals representing respectively the relative magnitudes of the samples in each of said sets; and
    means responsive to said signal for weighting respective ones of the samples in one of said series by weighting factors designated by respective ones of said signals.

11. A processor according to claim 10 wherein said weighting means includes means for delaying samples of said series prior to said weighting by an amount of time sufficient for said generating means to generate respective ones of said signals.

12. A processor according to claim 11 wherein said weighting means includes means for forming the logarithms of said samples, said weighting being accomplished by adding the logarithms of respective weighting factors to the logarithms of said samples.

* * * * *